United States Patent
Frem et al.

(10) Patent No.: US 9,645,978 B2
(45) Date of Patent: May 9, 2017

(54) TECHNIQUES FOR THE AUTOMATIC ANIMATION OF CHANGES TO DOCUMENT CONTENT

(75) Inventors: Peter Frem, Redmond, WA (US); Said Abou-Hallawa, Redmond, WA (US); Andrew Himberger, Woodinville, WA (US); Susan Baker, Snohomish, WA (US); Malia Douglas, Seattle, WA (US); Caitlin Ashley-Rollman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1 day.

(21) Appl. No.: 13/297,697

(22) Filed: Nov. 16, 2011

(65) Prior Publication Data

US 2013/0124952 A1    May 16, 2013

(51) Int. Cl.
| | | |
|---|---|---|
| *G06F 17/22* | (2006.01) | |
| *G06F 17/21* | (2006.01) | |
| *G06T 13/80* | (2011.01) | |
| *G06K 9/00* | (2006.01) | |

(52) U.S. Cl.
CPC ........ *G06F 17/212* (2013.01); *G06F 17/2211* (2013.01); *G06K 9/00463* (2013.01); *G06T 13/80* (2013.01)

(58) Field of Classification Search
CPC ....................................................... G06F 17/20
USPC ....................................................... 715/202
See application file for complete search history.

(56) References Cited

U.S. PATENT DOCUMENTS

| | | | |
|---|---|---|---|
| 6,091,422 A | * | 7/2000 | Ouaknine et al. ............ 345/419 |
| 2006/0242569 A1 | | 10/2006 | Grigoriadis et al. |
| 2007/0013699 A1 | * | 1/2007 | Nelson et al. ................ 345/473 |
| 2007/0067714 A1 | | 3/2007 | Lin et al. |
| 2007/0069973 A1 | * | 3/2007 | Gerbacia et al. ............. 345/1.1 |
| 2008/0177623 A1 | | 7/2008 | Fritsch et al. |
| 2008/0303826 A1 | | 12/2008 | Schiff |
| 2008/0303827 A1 | * | 12/2008 | Schiff .......................... 345/473 |

(Continued)

FOREIGN PATENT DOCUMENTS

| | | |
|---|---|---|
| CN | 1834954 A | 9/2006 |
| CN | 101499057 A | 8/2009 |

OTHER PUBLICATIONS

Chevalier, et al., "Using Text Animated Transitions to Support Navigation in Document Histories", Retrieved at <<http://www.aviz.fr/diffamation/diffamation-CHI2010.pdf>>, Proceedings of the 28th international conference on Human factors in computing systems, Apr. 10-15, 2010, pp. 10.

(Continued)

*Primary Examiner* — Kavita Padmanabhan
*Assistant Examiner* — Tionna Burke

(57) ABSTRACT

Techniques for the automatic animation of document content are described. An apparatus may comprise a difference component operative to receive an old layout of a document and a new layout of the document, the new layout corresponding to an application of one or more changes to the old layout of the document, the difference component operative to determine a set of differences between the old layout and the new layout, and an animation layer generation component operative to generate a set of animation layers from the set of differences. Other embodiments are described and claimed.

20 Claims, 8 Drawing Sheets

(56) References Cited

U.S. PATENT DOCUMENTS

| | | | |
|---|---|---|---|
| 2009/0006996 A1 | 1/2009 | Saha et al. | |
| 2009/0327921 A1 | 12/2009 | Holm-Peterson et al. | |
| 2012/0254733 A1* | 10/2012 | Tucovic | G06F 17/24 |
| | | | 715/243 |
| 2012/0256928 A1* | 10/2012 | Chiculita | G06T 13/20 |
| | | | 345/473 |
| 2013/0335425 A1* | 12/2013 | Haase | G06T 13/00 |
| | | | 345/473 |

OTHER PUBLICATIONS

"First Office Action and Search Report Received for Chinese Patent Application No. 201210458815.5", Mailed Date: Nov. 3, 2014, 12 Pages.

\* cited by examiner

TECHNIQUES FOR THE AUTOMATIC ANIMATION OF CHANGES TO DOCUMENT CONTENT

BACKGROUND

As documents are edited, changes to the document may be represented through changes in the on-screen display of the document. In a basic implementation, a first version of a document may be displayed, an edit may be received, and then the display may be changed without transition to show the edited document. For some basic changes, such as the addition of a new character to the end of a line of text, the immediate display of the edited document may be sufficient to communicate the manner in which the document has changed, with a smoother display providing a more pleasing visual experience. For more complicated or substantial changes, additional clarity may be provided to the user with a display that captures the change or changes to the document rather than merely switching from the display of the old version of the document to the new. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for the automatic animation of document content. Some embodiments are particularly directed to techniques for the automatic animation of document content to illustrate a change or edit to a document. In one embodiment, for example, an apparatus may comprise a difference component to receive an old layout of a document and a new layout of the document, the new layout corresponding to an application of one or more changes to the old layout of the document, the difference component operative to determine a set of differences between the old layout and the new layout, and an animation layer generation component operative to generate a set of animation layers from the set of differences. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
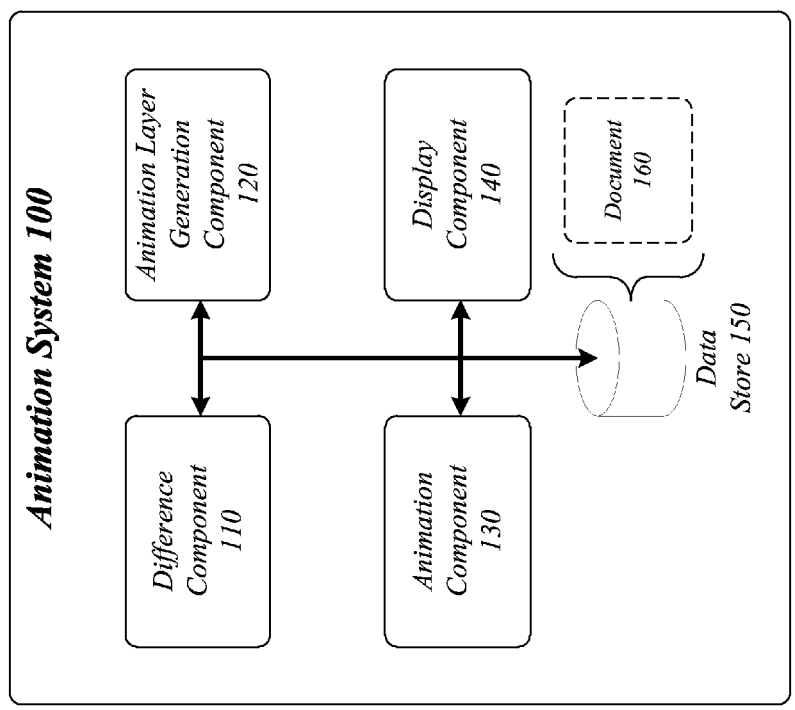
FIG. 1 illustrates an embodiment of a system for the automatic animation of document content.

Various embodiments are directed to techniques for the automatic animation of document content. Editing application, such as word processors, spreadsheet programs, presentation programs, and other programs for the creation and editing of documents allow for users to make changes, and these programs then represent those changes through changes in the on-screen display of the document. In some cases, this may be known as what-you-see-is-what-you-get (or WYSIWYG) editing. Most basically, these changes may be depicted by simply replacing the display of the pre-edit version of the document with the post-edit version of the document. Some changes, such as the addition or deletion of a few characters, may be adequately depicted by the immediate display of the new version of the document, though a smoother display may still provide a more pleasing visual experience. For more complicated or substantial changes, additional clarity may be provided to the user with a display that captures the change or changes to the document rather than merely switching from the display of the old version of the document to the new version of the document. An animation system may receive an old layout of a document and a new layout of a document, the new layout corresponding to an application of one or more changes to the old layout of the document. The animation system may determine a set of differences between the old layout and the new layout and generate a set of animation layers from the set of differences. These animation layers may then be used to generate an animation of the one or more changes, which animation may be displayed for the user to depict the changes. In this manner, a user may edit a document and receive a more comprehensive depiction of the process of their editing, allowing for a better appreciation for the manner in which a document is changed by those edits. Further, a more comprehensive depiction of the editing process may provide a dynamic and pleasing visual experience in addition to any improvements in clarity.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for an animation system 100. In one embodiment, the animation system 100 may comprise a computer-implemented animation system 100 having one or more software applications and/or components. Although the animation system 100 shown in FIG. 1 has a limited number of elements in a certain topology, it may be appreciated that the animation system 100 may include more or less elements in alternate topologies as desired for a given implementation.

In the illustrated embodiment shown in FIG. 1, the animation system 100 includes a difference component 110, an animation layer generation component 120, an animation component 130, a display component 140, and a data store 150. The difference component 110 is generally operative to receive an old layout of a document and a new layout of the document, the new layout corresponding to an application of one or more changes to the old layout of the document, the difference component 110 operative to determine a set of differences between the old layout and the new layout. The animation layer generation component 120 is generally operative to generate a set of animation layers from the set of differences. The animation component 130 is generally operative to generate an animation of the one or more changes using the generated set of animation layers. The display component 140 is generally operative to display the animation.

In various embodiments, the difference component 110 is generally operative to receive an old layout of a document 160 and a new layout of the document 160, the new layout corresponding to an application of one or more changes to the old layout of the document 160, the difference component 110 operative to determine a set of differences between the old layout and the new layout. The changes to the layout of a document 160 may correspond to any method by which a document 160 may be changed. In various embodiments, the changes to the layout may correspond to a user-initiated change or changes to the document 160, such as a user editing the document 160 in an editing program such as a word processing program, a presentation program, an office productivity program, a layout program, or any other program in which a user edits a document, such as those with substantially-real-time updates to the display of the document.

The layout of a document 160 may comprise both the contents of a document 160—what is and is not in the document 160—and the positioning of the elements of a document 160. A change or edit to a document 160 may therefore correspond to any change or modification to what content exists within a document 160 or any change or modification to the positioning of that content within the document 160. A change or modification to what content exists within a document 160 may be the addition or removal of elements from the document 160 or may be a change to one or more elements of document 160, such as a formatting change. A change to a document 160 may correspond to the addition or insert of a new element or elements into document 160. A change to a document 160 may correspond to the removal or deletion of an existing element or elements from a document 160. A change to a document 160 may correspond to the replacement of an element, such as where a first element is removed from the document 160 and a second element is put in its place. A change to a document 160 may correspond to a change in the position of an element or elements within the document, such as moving an element or elements from a first position to a second position. A change to a document 160 may correspond to a change in the size of an element or elements, such as changing an element or elements from a first size to a second size. A change to a document 160 may correspond to a combined move and resize, such as moving an element or elements from a first position to a second position while changing the size of the element or elements from a first size to a second size.

In various embodiments, a change may refer to a user-initiated, programmatically-initiated, or externally-initiated command or set of commands to an editing application for the document 160. In various embodiments, a change to a document 160 may represent a user perspective on editing a document. A change may correspond to a user action such as entering text or initiating commands or routines in an editing application.

In various embodiments, a difference between an old layout and a new layout may correspond to differences in the stored representation of the layout on disk, in memory, in a cache, or using any other means of storing or managing a layout. In various embodiments, the stored representation of a layout of a document 160 may not contain a record of the user-initiated changes to the layout except to the degree that those changes have modified the stored representation of the layout. As such, a change may correspond to an action performed on a document 160 while a difference corresponds to differences in the stored layout of a document 160.

In various embodiments, a difference may be the result of a change as reflected in the layout of a document 160. In various embodiments, the stored layout of a document 160 may not contain a representation of the changes to the document 160 beyond the differences in the stored layout. In some embodiments, knowledge of a user action which initiates or immediately precedes the difference and animation process may be used in generating the animation. In some embodiments, if a user initiates an action, the portion of the animation associated with that action may be the focus of the generated animation, such as by extending the duration of that associated portion of the animation or by using a more complex or distinct type of animation for that portion. Similarly, portions of the animation not associated with that action may be muted or otherwise reduced in focus, such as by limiting the duration of that un-associated portion of the animation or using a less complex or less noticeable type of animation for that portion. For example, if a picture is inserted into a document, the portion of the animation relating to the insertion of the picture, such as the appearance of that picture, may be made the focus of the generated animation, while other portions of the animation are decreased in focus. In some embodiments, this may mean that the direct effects of a user action, such as the appearance of an insert element, are focused on in the generated animation, while the indirect effects of a user action, such as the repositioning of surrounding elements, are not focused on in the generated animation. Alternatively or additionally, the difference component 110 may not make use of, or may not be able to make use of, any knowledge of changes to the document 160 beyond what is represented in the stored old and new layouts of the document 160.

In various embodiments, the difference component 110 may be operative to determine a first portion of the old layout and a second portion of the new layout, the second portion corresponding to the first portion after the application of the one or more changes, the difference component operative to generate a difference structure comprising differences between the first portion and the second portion, the difference structure used in determining the set of differences. A portion of a layout may comprise an area of the layout, including one bounded by a geometric shape such as a rectangle. In various embodiments, a portion of a layout may comprise the contents of a particular rectangle bounding an area of the layout.

In some embodiments, a hierarchical structure may be used to store the document 160. In these embodiments, a portion of a layout may comprise a branch of this hierarchical structure. For example, a layout may be stored based on the hierarchy: shape, textbox, table row, table cell, line of text, and range of text, ordered from the highest level of the hierarchy (the level of the hierarchy closest to the root) to the lowest (the level of the hierarchy furthest from the root). For instance, a shape may contain a textbox within it, the textbox being composed of lines of text, each line of text being composed of a range of text. A portion of a layout may therefore comprise the subset of the hierarchy, such as a sub-tree of a tree-shaped hierarchy, rooted at one of these types of element. For example, a portion of a layout may correspond to a textbox and all of the lines of text and ranges of text within the textbox. As such, in some embodiments, a second portion corresponds to a first person after the application of one or more changes if the second portion occupies the same position in the hierarchical structure as the first portion did prior to the application of the one or more changes. For example, if the first portion of the document corresponds to a line of text, and the changes correspond to the addition of characters to the line of text, then the second portion would correspond to the same line of text but would include within it the additional characters. In these embodiments, the differences between the first portion and the second portion would comprise the difference in the subset of the hierarchical structure corresponding to these portions.

In various embodiments, the difference component 110 may be generally operative to determine a plurality of difference structures, each difference structure being of a type, and to combine together compatible difference structures of a same type. In various embodiments, each difference structure may correspond to a particular element within a hierarchical storage of document 160 and all of the elements contained within that particular element. The types may correspond to the nature of the difference, such as an insertion, a deletion, a move, a resize, a move-and-resize, or a replacement. An insertion may correspond to the creation of a new element within the layout of a document 160. A deletion may correspond to the removal of an element from the layout of a document 160. A move may correspond to a change in position of an element within the layout of a document 160. A resize may correspond to a change in the size of an element within the layout of a document 160. A move-and-resize may correspond to a combined change in position and change in size of an element within the layout of a document 160. A replacement may correspond to the removal of a first element and the insertion of a second element at the same position in the layout or the same position in the hierarchical storage of the layout, or may correspond to a change to the formatting of an element such as a change in color or any other change or addition of a visual element to an element that doesn't change the size of the changed element, such as adding underlining or strikethrough.

In various embodiments, two difference structures may be compatible for combining if they correspond to differences of the same type of and to elements that are adjacent children of the same element within the hierarchical structure. For example, difference structures corresponding to differences in two ranges of text may be compatible for combining if they are adjacent members of the same line of text and are both insertions of text. Similarly, difference structures corresponding to two table cells, each of which may contain one or more lines of text or ranges of text, may be compatible for combining if the corresponding tables cells are adjacent tables cells within the same table row and are both the deletion of a table cell. This combination may allow for a more natural animation of the changes. Rather than separately animating the removal of two cells, for example, a single animation for the removal of both cells may be displayed. This combining may be applied to all of the type of differences.

In various embodiments, the difference component 110 may be generally operative to determine which difference structures to combine together by analyzing the plurality of difference structures for compatibility and type at iteratively smaller scopes. For example, the difference component 110 may first determine whether difference structures corresponding to shapes can be combined, then difference structures corresponding to textboxes, and so forth down to difference structures corresponding to ranges of text. In general, the difference component 110 may be generally operative to determine a minimum set of difference structures such that each difference structure corresponds to the highest level of the hierarchy, the highest scope, such that the difference stored by the difference structure represents a change of a single type at that level of the hierarchy.

In various embodiments, the new layout may comprise a set of command hints, the command hints indicating information about one or more of the one or more changes, the difference component operative to determine the set of differences using the command hints. A command hint may represent a structure contained within the layout that describes the command used to generate a particular change in the layout. A command hint may be appropriate where the changes to a layout may be difficult to determine based on the differences in the stored layout. For example, changes made to tables with a single command in an editing application may require several edit actions to be run by the editing application. A command hint may be used to encapsulate these multiple edit actions into a single action stored with a command hint structure associated with the edited element in the new layout. A command hint may allow for the creation of a single difference structure comprising the differences between the old layout and the new layout caused by the command represented by the command hint. In various embodiments, the command hint may be used to influence the type or duration of an animation used to depict the change caused by the command. In various embodiments, the command hint may be used to include unchanged elements within a difference structure in order to produce a more comprehensive or clear animation. For example, a command hint may specify that when only a subset of a table's cells are changed in size that the change in size of the table will be depicted as a whole rather than individually animating the changed cells.

In various embodiments, the animation layer generation component 120 may be generally operative to generate a set of animation layers from the set of differences. An animation layer may be a graphical representation of a portion of a layout for use in generating an animation of a change. An animation layer may be specific to a particular type of difference. In various embodiments, each animation layer may be associated with a single generated difference or difference structure. An insertion animation layer may correspond to an insertion difference, the insertion animation layer containing the element or elements inserted into the document, the insertion animation layer therefore containing the portion of the new layout corresponding to the differences in the layout after the application of a change that inserts a new element or elements into the document. A deletion animation layer may correspond to a deletion difference, the deletion animation layer containing the element or elements removed from the document, the deletion animation layer therefore containing the portion of the old layout corresponding to the differences in the layout before the application of a change that removes one or more elements from the document. A move animation layer may correspond to a move difference, the move animation layer containing an element or elements moved within the document, the move animation layer therefore containing a portion of the layout that moves during the application of a change that moves an element or elements. A resize animation layer may correspond to a resize difference, the resize animation layer containing an element or elements resized within the document, the resize animation layer therefore containing a portion of the layout that is resized during the application of a change that resizes an element or elements. A move-and-resize animation layer may correspond to a move-and-resize difference, the move-and-resize animation layer containing an element or elements both moved and resized within the document, the move-and-resize animation layer therefore containing a portion of the layout that is both moved and resized during the application of a change that moves and resizes an element or elements. A replacement difference may have a pair of corresponding animation layers, the first corresponding animation layer an insertion animation layer and the second a deletion animation layer, the insertion animation layer containing the element or elements inserted into the document, the deletion animation layer containing the element or elements removed from the document. It will be appreciated that an insertion animation layer may correspond to the new version of a reformatted or otherwise changed element, and does not have to correspond to only those cases in which an additional element is added to a layout. Similarly, it will be appreciated that a deletion animation layer may correspond to an old version of a reformatted or otherwise changed element, and does not have to correspond to only those cases in which an element is removed from a layout. It will be appreciated by those skilled in the art that this list of difference types is not exhaustive and that other related types of animation layers may be used. In some embodiments, one or more types of special-case animation layers may be used. For example, a word moved through a word-wrapping process from the end of one line to the start of the next may require a special-case animation layer and/or special-case animation in order to avoid depicting the word sliding across existing text. In some embodiments, this special-case may be depicted by a first animation depicting the word leaving the first line followed by a second animation depicting the word entering the second line.

In various embodiments, the animation layer generation component 120 may be generally operative to retrieve portions of a rendering of the old layout in order to generate an animation layer which contains portions of the old layout. Deletion animation layers, move animation layers, move-and-resize animation layers, and replacement animation layers will all use some portion of the rendering of the old layout. In various embodiments, the animation layer generation component 120 may be generally operative to retrieve portions of a rendering of the new layout in order to generate an animation layer which contains portions of the new layout. As such, the animation layout generation component 120 may be generally operative to invoke the rendering of the new layout in order to be able to retrieve portions of the new layout. Both insertion animation layers and replacement animation layers will use some portion of the rendering of the new layout. In various embodiments, the animation layer generation component 120 may be operative to cache a rendering of the old layout in order to retrieve required portions for the generation of animation layers without needing to re-render the old layout and without needing to have a copy of the old layout stored for rendering. In various embodiments, the animation layer generation component 120 may be operative to retrieve portions of the rendering of the old layout prior to the rendering of the new layout such that no simultaneous storage of the renderings of the old layout and new layout is required, such as where the rendering of the new layout would replace the rendering of the old layout in memory. Therefore, the animation layer generation component 120 may be operative to operate in the gap in time between the reception of a user edit and the rendering of the new layout resulting from the user edit. In various embodiments, the units used to represent the layout in a storage structure may not be the same as the units used to represent a rendered layout. Those of ordinary skill in the art will appreciate that any number of existing techniques may be used to translate between storage measurement units and rendered layout units.

In various embodiments, the animation component 130 may be generally operative to generate an animation of the one or more changes using the generated set of animation layers. This animation may make use of any of the known techniques for generating animations from animation layers. The use of animation layers may allow for the use of only those techniques and effects which act on the animation layer as a whole. These animation techniques may include, but are not limited to: fading in, fading out, moving, resizing, unveiling, rotating in two-dimensions, and flipping on a three-dimensional axis.

Animating an insertion difference may comprise fading in an insertion animation layer such that the inserted element or elements gradually appear in the appropriate location, or may comprise any other technique for depicting the appearance of an element at a particular location. Animating a deletion difference may comprise fading out a deletion animation layer such that the deleted element or elements gradually disappear from the appropriate location, or may comprise any other technique for depicting the disappearance of an element from a particular location.

Animating a move difference may comprise moving a move animation layer from the old position of the element or elements in the old layout to the new position of the element or elements in the new layout such that the moved element or elements transitions in displayed location from the old position to the new position. In some instances, such as where the element or elements transition only a short distance, a direct move may be fully depicted. In some instances, such as where the element or elements transition a longer distance, such as across a substantial portion of the screen, or where the element or elements transition across other elements, animating a move difference may comprise depicting only a portion of the move, such as only the beginning or end, or any other abbreviated animation of a move. In general, a move difference will generate an animation capturing the transition of an element or elements from a first location to a second location.

Animating a resize difference may comprise resizing a resize animation layer such that the resized element or elements gradually transition in size from their old size to their new size. Animating a resize difference may comprise any technique for depicting a change from an old size to a new size. Animating a resize difference may comprise depicting a transition between the old display of an element or elements and the new display of an element or elements, such that a change in size is depicted. For instance, if an element or elements are increased in size, a rendering of the element or elements at the new size may be scaled down to the old size and then depicted increasing in size to the new size. Alternatively, if an element or elements are decreased in size, a rendering of the element or elements at the old size may be depicted decreasing in size to the new, smaller size.

Animating a move-and-resize difference may comprise both moving and resizing a move-and-resize animation layer such that the moved-and-resized element or elements gradually and simultaneously transition in displayed location and size from the old location and old size to their new location and new size. Generally, animating a move-and-resize difference may comprise any combination of the techniques for animating a move difference and a resize difference.

Animating a replacement difference may comprise any animation technique for transition between a first image and a second image. In some embodiments, animating a replacement difference may comprise simultaneously fading out a deletion animation layer while fading in an insertion animation layer, or may alternatively comprise sequentially fading out a deletion animation layer and then fading in an insertion animation layer, such that the removed element or elements gradually disappear and the replacing element or elements gradually appear. In some embodiments, animating a replacement difference may comprise wiping between a deletion animation layer and an insertion animation layer, may comprise performing a three-dimensional flip between a deletion animation layer and an insertion animation layer, or may comprise any animation effect which combines a first animation layer and a second animation layer into a single effect that communicates a transition from the first animation layer to the second animation layer.

In various embodiments, the animation component 130 may be generally operative to determine a duration of the animation based on one or more of a complexity of a displayed page of the document 160, a complexity of the set of differences, a weight of a command carried out immediately prior to invoking the new layout, a momentum of editing, a zooming factor, a number of pages visible in the displayed portion of the document 160, and a maximum duration. In some embodiments, the duration of the animation may be based on all of the above-listed factors. In some embodiments, the duration of the animation may be based on only some or only one of the above-listed factors. Further, it will be appreciated by those of ordinary skill in the arts that additional factors may be used in the determination of the duration of an animation. The animation component 130 may use a relatively longer duration for a more complex set of differences so that a more complex change to a document is given more visual impact. The animation component 130 may use a relatively shorter duration if the displayed page of the document 160 is more complex. The animation component 130 may examine the ratio of the complexity of the set of differences to the complexity of the displayed page of the document 160 so that a longer animation duration is used for changes or differences which represent a larger percentage of the total complexity of the displayed page of the document 160. A momentum of editing may correspond to the speed or intensity with which a user is editing a document 160, with the editing momentum being larger if the user is editing at a greater speed or has sustained editing for a longer period of time, and the editing momentum being smaller if the user is editing at a lesser speed or has sustained editing for a lesser period of time. The animation component 130 may use a relatively shorter duration for a larger editing momentum in order to provide less of a distraction or interruption to the user's editing. The zooming factor may correspond to the degree of magnification of the display of a document 160, with a higher zoom factor corresponding to a higher degree of magnification. The animation component 130 may use a relatively longer duration for a higher zoom factor as the display of the layout is likely to be more focused on the edited portion and therefore changes to the edited portion are likely to make up a more substantial portion of the display and therefore warrant more attention. The animation component 130 may use a relatively shorter duration for if a larger number of pages visible in the displayed portion of the document 160 as the display of the layout is likely to be less focused on the edited portion and therefore changes to the edited portion are likely to make up a less substantial portion of the display and therefore warrant less attention. The maximum duration may correspond to the maximum allowed duration for an animation. In various embodiments, the animation duration may be calculated according to the following formula:

$$\text{duration} = \frac{\text{complexity of the set of differences}}{\text{complexity of the displayed page}} * \text{weight of command} * \frac{1}{\text{momentum}} * \frac{\text{zooming}}{500} * \frac{1}{\text{number of pages}} * \text{max duration}$$

In this formula, the complexity of the set of differences will never be larger than the complexity of the displayed page, and as such, the fraction capturing the ratio between the two will never be greater than one. The weight of the command may vary between 0 and 1 and is determined by a pre-calculated weighting of all the available editing commands. The momentum may vary between 1 and infinity, such that the inverse above is never greater than 1. The zooming factor may vary between 10 and 500, with 500 representing a 500% zoom, and a 10 representing a 10% zoom factor corresponding to a reduction in displayed size by a factor of 10, though it will be appreciated that alternative upper and lower bounds for the zooming factor may be used. Generally, the zooming factor will be divided by its upper-bound in the calculation of the animation duration, such that the zooming factor divided by the associated constant will never be greater than one. In some embodiments an alternative divisor will be used, such as where the result of the zooming factor being divided by the associated divisor is capped at 1 through the use of a ceiling function or other function for compelling a maximum result. The number of pages may never be less than 1, such that the inverse above is never greater than 1. As such, the max duration will always be multiplied by a series of fractions, each of which is never larger than 1, thereby resulting in a determined duration that will never be greater than the max duration.

In various embodiments, the display component 140 may be generally operative to display the animation. Displaying the animation may be accomplished with any of a number of well-known techniques for displaying an animation on a suitable display.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
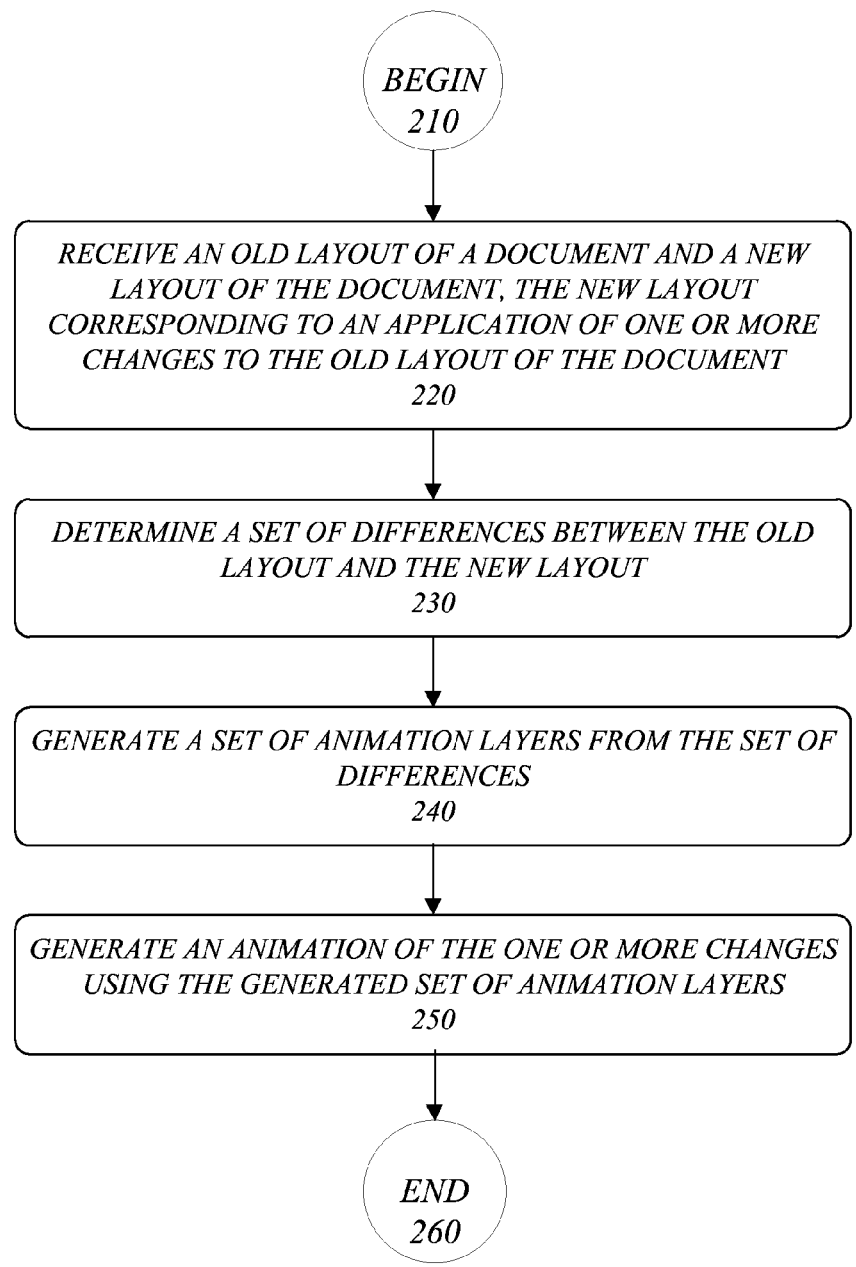
FIG. 2 illustrates an embodiment of a logic flow for the system of FIG. 1.

FIG. 2 illustrates one embodiment of a logic flow 200. The logic flow 200 may be representative of some or all of the operations executed by one or more embodiments described herein.

In operation 210, operations for the logic flow 200 are initiated.

In operation 220, an old layout of a document and a new layout of the document are received, the new layout corresponding to an application of one or more changes to the old layout of the document. The changes to the layout of a document may correspond to any method by which a document may be changed. In various embodiments, the changes to the layout may correspond to a user-initiated change or changes to the document, such as a user editing the document in an editing program such as a word processing program, a presentation program, an office productivity program, a layout program, or any other program in which a user edits a document, such as those with substantially-real-time updates to the display of the document.

The layout of a document may comprise both the contents of a document—what is and is not in the document—and the positioning of the elements of a document. A change or edit to a document may therefore correspond to any change or modification to what content exists within a document or any change or modification to the positioning of that content within the document. A change or modification to what content exists within a document may be the addition or removal of elements from the document or may be a change to one or more elements of document, such as a formatting change. A change to a document may correspond to the addition or insert of a new element or elements into document. A change to a document may correspond to the removal or deletion of an existing element or elements from a document. A change to a document may correspond to the replacement of an element, such as where a first element is removed from the document and a second element is put in its place. A change to a document may correspond to a change in the position of an element or elements within the document, such as moving an element or elements from a first position to a second position. A change to a document may correspond to a change in the size of an element or elements, such as changing an element or elements from a first size to a second size. A change to a document may correspond to a combined move and resize, such as moving an element or elements from a first position to a second position while changing the size of the element or elements from a first size to a second size.

In various embodiments, a change may refer to a user-initiated, programmatically-initiated, or externally-initiated command or set of commands to an editing application for the document. In various embodiments, a change to a document may represent a user perspective on editing a document. A change may correspond to a user action such as entering text or initiating commands or routines in an editing application.

In operation 230, a set of differences is determined between the old layout and the new layout. A difference between an old layout and a new layout may correspond to differences in the stored representation of the layout on disk, in memory, in a cache, or using any other means of storing or managing a layout. In various embodiments, the stored representation of a layout of a document may not contain a record of the user-initiated changes to the layout except to the degree that those changes have modified the stored representation of the layout. As such, a change may correspond to an action performed on a document while a difference corresponds to differences in the stored layout of a document. In various embodiments, a difference may be the result of a change as reflected in the layout of a document. In various embodiments, the stored layout of a document may not contain a representation of the changes to the document beyond the differences in the stored layout. In some embodiments, the determination of the set of differences between the old layout and the new layout may not make use of, or may not be able to make use of, any knowledge of changes to the document beyond what is represented in the stored old and new layouts of the document.

In various embodiments, a first portion of the old layout and a second portion of the new layout may be determined, the second portion corresponding to the first portion after the application of the one or more changes. A difference structure may be generated comprising differences between the first portion and the second portion, the difference structure used in determining the set of differences. A portion of a layout may comprise an area of the layout, including one bounded by a geometric shape such as a rectangle. In various embodiments, a portion of a layout may comprise the contents of a particular rectangle bounding an area of the layout.

In some embodiments, a hierarchical structure may be used to store the document. In these embodiments, a portion of a layout may comprise a branch of this hierarchical structure. For example, a layout may be stored based on the hierarchy: shape, textbox, table row, table cell, line of text, and range of text, ordered from the highest level of the hierarchy (the level of the hierarchy closest to the root) to the lowest (the level of the hierarchy furthest from the root). For instance, a shape may contain a textbox within it, the textbox being composed of lines of text, each line of text being composed of a range of text. A portion of a layout may therefore comprise the subset of the hierarchy, such as a sub-tree of a tree-shaped hierarchy, rooted at one of these types of element. For example, a portion of a layout may correspond to a textbox and all of the lines of text and ranges of text within the textbox. As such, in some embodiments, a second portion corresponds to a first person after the application of one or more changes if the second portion occupies the same position in the hierarchical structure as the first portion did prior to the application of the one or more changes. For example, if the first portion of the document corresponds to a line of text, and the changes correspond to the addition of characters to the line of text, then the second portion would correspond to the same line of text but would include within it the additional characters. In these embodiments, the differences between the first portion and the second portion would comprise the difference in the subset of the hierarchical structure corresponding to these portions.

In various embodiments, a plurality of difference structures may be determined, each difference structure being of a type, and then compatible difference structures of a same type combined together. In various embodiments, each difference structure may correspond to a particular element within a hierarchical storage of document and all of the elements contained within that particular element. The types may correspond to the nature of the difference, such as an insertion, a deletion, a move, a resize, a move-and-resize, or a replacement. An insertion may correspond to the creation of a new element within the layout of a document. A deletion may correspond to the removal of an element from the layout of a document. A move may correspond to a change in position of an element within the layout of a document. A resize may correspond to a change in the size of an element within the layout of a document. A move-and-resize may correspond to a combined change in position and change in size of an element within the layout of a document. A replacement may correspond to the removal of a first element and the insertion of a second element at the same position in the layout or the same position in the hierarchical storage of the layout, or may correspond to a change to the formatting of an element such as a change in color or any other change or addition of a visual element to an element that doesn't change the size of the changed element, such as adding underlining or strikethrough.

In various embodiments, two difference structures may be compatible for combining if they correspond to differences of the same type of and to elements that are adjacent children of the same element within the hierarchical structure. For example, difference structures corresponding to differences in two ranges of text may be compatible for combining if they are adjacent members of the same line of text and are both insertions of text. Similarly, difference structures corresponding to two table cells, each of which may contain one or more lines of text or ranges of text, may be compatible for combining if the corresponding table cells are adjacent table cells within the same table row and are both the deletion of a table cell. This combination may allow for a more natural animation of the changes. Rather than separately animating the removal of two cells, for example, a single animation for the removal of both cells may be displayed.

In various embodiments, which difference structures to combine together may be determined by analyzing the plurality of difference structures for compatibility and type at iteratively smaller scopes. For example, it may first determined whether difference structures corresponding to shapes can be combined, then difference structures corresponding to textboxes, and so forth down to difference structures corresponding to ranges of text. In general, a minimum set of difference structures may be determined such that each difference structure corresponds to the highest level of the hierarchy, the highest scope, such that the difference stored by the difference structure represents a change of a single type at that level of the hierarchy.

In some embodiments, when combining difference structures, additional elements may be included in a difference structure beyond those of the combined difference structures. In some instances, if two or more sub-elements of a particular element have associated difference structures then all sub-elements of the particular element may be included in the combined difference structure. This may be used when a better visual result will occur from animating all of the sub-elements of a particular element within the hierarchy. For example, if all the cells in a row except for one are changed, the un-changed cell may be included in a combined difference structure to produce a more unified visual result for the animation.

In various embodiments, the new layout may comprise a set of command hints, the command hints indicating information about one or more of the one or more changes, the difference component operative to determine the set of differences using the command hints. A command hint may represent a structure contained within the layout that describes the command used to generate a particular change in the layout. A command hint may be appropriate where the changes to a layout may be difficult to determine based on the differences in the stored layout. For example, changes made to tables with a single command in an editing application may require several edit actions to be run by the editing application. A command hint may be used to encapsulate these multiple edit actions into a single action stored with a command hint structure associated with the edited element in the new layout. A command hint may allow for the creation of a single difference structure comprising the differences between the old layout and the new layout caused by the command represented by the command hint. In various embodiments, the command hint may be used to influence the type or duration of an animation used to depict the change caused by the command. In various embodiments, the command hint may be used to include unchanged elements within a difference structure in order to produce a more comprehensive or clear animation. For example, a command hint may specify that when only a subset of a table's cells are changed in size that the change in size of the table will be depicted as a whole rather than individually animating the changed cells.

In operation 240, a set of animation layers may be generated from the set of differences. An animation layer may be a graphical representation of a portion of a layout for use in generating an animation of a change. An animation layer may be specific to a particular type of difference. In various embodiments, each animation layer may be associated with a single generated difference or difference structure. An insertion animation layer may correspond to an insertion difference, the insertion animation layer containing the element or elements inserted into the document, the insertion animation layer therefore containing the portion of the new layout corresponding to the differences in the layout after the application of a change that inserts a new element or elements into the document. A deletion animation layer may correspond to a deletion difference, the deletion animation layer containing the element or elements removed from the document, the deletion animation layer therefore containing the portion of the old layout corresponding to the differences in the layout before the application of a change that removes one or more elements from the document. A move animation layer may correspond to a move difference, the move animation layer containing an element or elements moved within the document, the move animation layer therefore containing a portion of the layout that moves during the application of a change that moves an element or elements. A resize animation layer may correspond to a resize difference, the resize animation layer containing an element or elements resized within the document, the resize animation layer therefore containing a portion of the layout that is resized during the application of a change that resizes an element or elements. A move-and-resize animation layer may correspond to a move-and-resize difference, the move-and-resize animation layer containing an element or elements both moved and resized within the document, the move-and-resize animation layer therefore containing a portion of the layout that is both moved and resized during the application of a change that moves and resizes an element or elements. A replacement difference may have a pair of corresponding animation layers, the first corresponding animation layer an insertion animation layer and the second a deletion animation layer, the insertion animation layer containing the element or elements inserted into the document, the deletion animation layer containing the element or elements removed from the document. It will be appreciated that an insertion animation layer may correspond to the new version of a reformatted or otherwise changed element, and does not have to correspond to only those cases in which an additional element is added to a layout. Similarly, it will be appreciated that a deletion animation layer may correspond to an old version of a reformatted or otherwise changed element, and does not have to correspond to only those cases in which an element is removed from a layout. It will be appreciated by those skilled in the art that this list of difference types is not exhaustive and that other related types of animation layers may be used. In some embodiments, one or more types of special-case animation layers may be used. For example, a word moved through a word-wrapping process from the end of one line to the start of the next may require a special-case animation layer and/or special-case animation in order to avoid depicting the word sliding across existing text. In some embodiments, this special-case may be depicted by a first animation depicting the word leaving the first line followed by a second animation depicting the word entering the second line.

In various embodiments, portions of a rendering of the old layout may be retrieved in order to generate an animation layer which contains portions of the old layout. Deletion animation layers, move animation layers, move-and-resize animation layers, and replacement animation layers will all use some portion of the rendering of the old layout. In various embodiments, portions of a rendering of the new layout may be retrieved in order to generate an animation layer which contains portions of the new layout. As such, the rendering of the new layout may be invoked in order to be able to retrieve portions of the new layout. Both insertion animation layers and replacement animation layers will use some portion of the rendering of the new layout. In various embodiments, a rendering of the old layout may be cached in order to retrieve required portions for the generation of animation layers without needing to re-render the old layout and without needing to have a copy of the old layout stored for rendering. In various embodiments, portions of the rendering of the old layout may be retrieved prior to the rendering of the new layout such that no simultaneous storage of the renderings of the new layout and old layout is required, such as where the rendering of the new layout would replace the rendering of the old layout in memory. Therefore, the animation layer generation process may be operative to operate in the gap in time between the reception of a user edit and the rendering of the new layout resulting from the user edit. In various embodiments, the units used to represent the layout in a storage structure may not be the same as the units used to represent a rendered layout. Those of ordinary skill in the art will appreciate that any number of existing techniques may be used to translate between storage measurement units and rendered layout units.

In operation 250, an animation of the one or more changes is generated using the generated set of animation layers. This animation may make use of any of the known techniques for generating animations from animation layers. The use of animation layers may allow for the use of only those techniques and effects which act on the animation layer as a whole. These animation techniques may include, but are not limited to: fading in, fading out, moving, resizing, unveiling, rotating in two-dimensions, and flipping on a three-dimensional axis.

Animating an insertion difference may comprise fading in an insertion animation layer such that the inserted element or elements gradually appear in the appropriate location, or may comprise any other technique for depicting the appearance of an element at a particular location. Animating a deletion difference may comprise fading out a deletion animation layer such that the deleted element or elements gradually disappear from the appropriate location, or may comprise any other technique for depicting the disappearance of an element from a particular location.

Animating a move difference may comprise moving a move animation layer from the old position of the element or elements in the old layout to the new position of the element or elements in the new layout such that the moved element or elements transitions in displayed location from the old position to the new position. In some instances, such as where the element or elements transition only a short distance, a direct move may be fully depicted. In some instances, such as where the element or elements transition a longer distance, such as across a substantial portion of the screen, or where the element or elements transition across other elements, animating a move difference may comprise depicting only a portion of the move, such as only the beginning or end, or any other abbreviated animation of a move. In general, a move difference will generate an animation capturing the transition of an element or elements from a first location to a second location.

Animating a resize difference may comprise resizing a resize animation layer such that the resized element or elements gradually transition in size from their old size to their new size. Animating a resize difference may comprise any technique for depicting a change from an old size to a new size. Animating a resize difference may comprise depicting a transition between the old display of an element or elements and the new display of an element or elements, such that a change in size is depicted. For instance, if an element or elements are increased in size, a rendering of the element or elements at the new size may be scaled down to the old size and then depicted increasing in size to the new size. Alternatively, if an element or elements are decreased in size, a rendering of the element or elements at the old size may be depicted decreasing in size to the new, smaller size.

Animating a move-and-resize difference may comprise both moving and resizing a move-and-resize animation layer such that the moved-and-resized element or elements gradually and simultaneously transition in displayed location and size from the old location and old size to their new location and new size. Generally, animating a move-and-resize difference may comprise any combination of the techniques for animating a move difference and a resize difference.

Animating a replacement difference may comprise any animation technique for transition between a first image and a second image. In some embodiments, animating a replacement difference may comprise simultaneously fading out a deletion animation layer while fading in an insertion animation layer, or may alternatively comprise sequentially fading out a deletion animation layer and then fading in an insertion animation layer, such that the removed element or elements gradually disappear and the replacing element or elements gradually appear. In some embodiments, animating a replacement difference may comprise wiping between a deletion animation layer and an insertion animation layer, may comprise performing a three-dimensional flip between a deletion animation layer and an insertion animation layer, or may comprise any animation effect which combines a first animation layer and a second animation layer into a single effect that communicates a transition from the first animation layer to the second animation layer.

In various embodiments, a duration of the animation may be determined based on one or more of a complexity of a displayed page of the document, a complexity of the set of differences, a weight of a command carried out immediately prior to invoking the new layout, a momentum of editing, a zooming factor, a number of pages visible in the displayed portion of the document, and a maximum duration. In some embodiments, the duration of the animation may be based on all of the above-listed factors. In some embodiments, the duration of the animation may be based on only some or only one of the above-listed factors. Further, it will be appreciated by those of ordinary skill in the arts that additional factors may be used in the determination of the duration of an animation. A relatively longer duration may be used for a more complex set of differences so that a more complex change to a document is given more visual impact. A relatively shorter duration may be used if the displayed page of the document is more complex. The ratio of the complexity of the set of differences to the complexity of the displayed page of the document may be examined so that a longer animation duration is used for changes or differences which represent a larger percentage of the total complexity of the displayed page of the document. A momentum of editing may correspond to the speed or intensity with which a user is editing a document, with the editing momentum being larger if the user is editing at a greater speed or has sustained editing for a longer period of time, and the editing momentum being smaller if the user is editing at a lesser speed or has sustained editing for a lesser period of time. A relatively shorter duration may be used for a larger editing momentum in order to provide less of a distraction or interruption to the user's editing. The zooming factor may correspond to the degree of magnification of the display of a document, with a higher zoom factor corresponding to a higher degree of magnification. A relatively longer duration may be used for a higher zoom factor as the display of the layout is likely to be more focused on the edited portion and therefore changes to the edited portion are likely to make up a more substantial portion of the display and therefore warrant more attention. A relatively shorter duration may be used when a larger number of pages are visible in the displayed portion of the document as the display of the layout is likely to be less focused on the edited portion and therefore changes to the edited portion are likely to make up a less substantial portion of the display and therefore warrant less attention. The maximum duration may correspond to the maximum allowed duration for an animation. In various embodiments, the animation duration may be calculated according to the following formula:

$$\text{duration} = \frac{\text{complexity of the set of differences}}{\text{complexity of the displayed page}} * \text{weight of command} * \frac{1}{\text{momentum}} * \frac{\text{zooming}}{500} * \frac{1}{\text{number of pages}} * \text{max duration}$$

In this formula, the complexity of the set of differences will never be larger than the complexity of the displayed page, and as such, the fraction capturing the ratio between the two will never be greater than one. The weight of the command may vary between 0 and 1 and is determined by a pre-calculated weighting of all the available editing commands. The momentum may vary between 1 and infinity, such that the inverse above is never greater than 1. The zooming may vary between 10 and 500, with 500 representing a 500% zoom, and a 10 representing a 10% zoom factor corresponding to a reduction in displayed size by a factor of 10, though it will be appreciated that alternative upper and lower bounds for the zooming factor may be used. Generally, the zooming factor will be divided by its upper-bound in the calculation of the animation duration, such that the zooming factor divided by the associated constant will never be greater than one. In some embodiments an alternative divisor will be used, such as where the result of the zooming factor being divided by the associated divisor is capped at 1 through the use of a ceiling function or other function for compelling a maximum result. The number of pages may never be less than 1, such that the inverse above is never greater than 1. As such, the max duration will always be multiplied by a series of fractions, each of which is never larger than 1, thereby resulting in a determined duration that will never be greater than the max duration.

In various embodiments, the generated animation may be displayed. Displaying the animation may be accomplished with any of a number of well-known techniques for displaying an animation on a suitable display.

Figure 3:
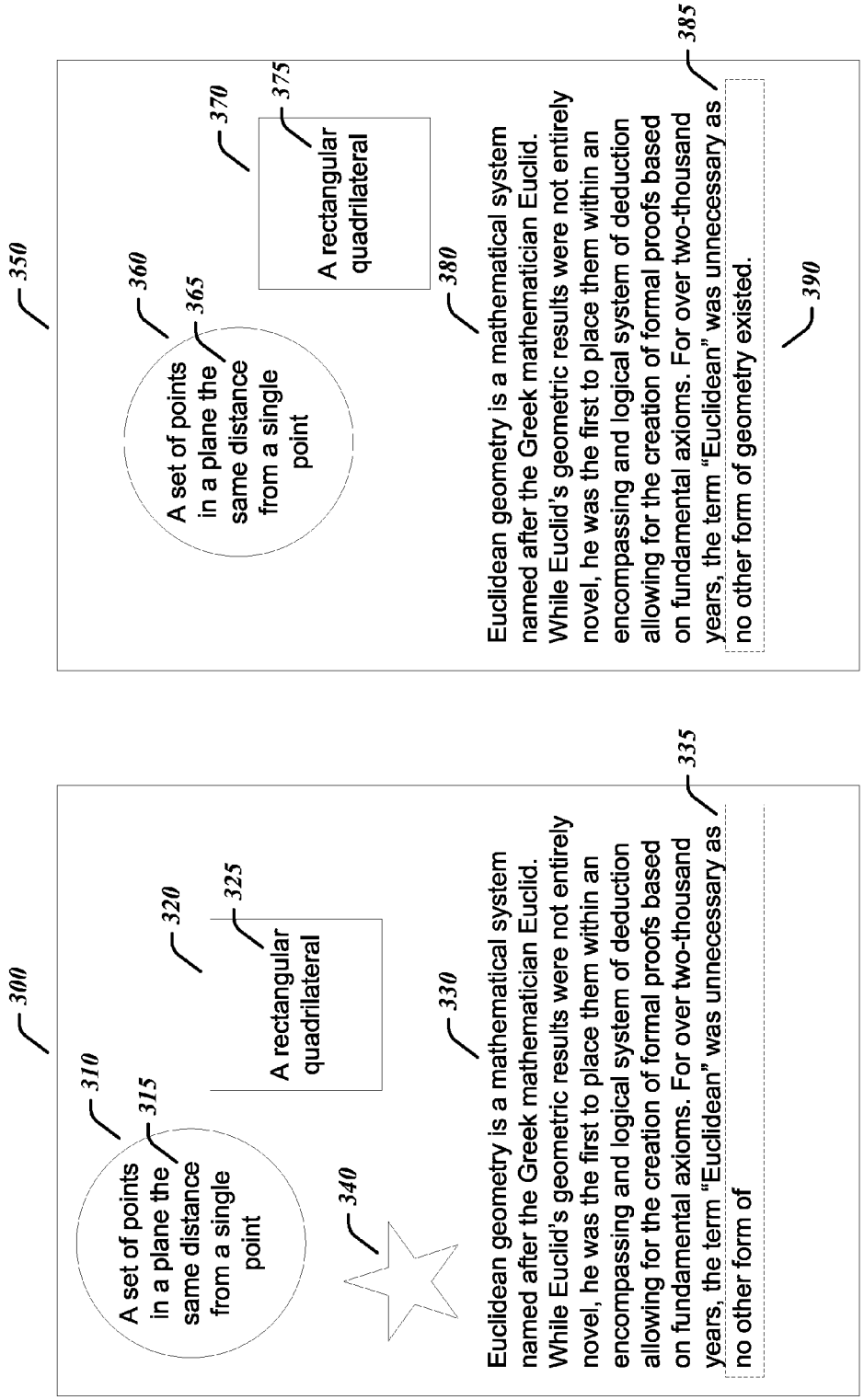
FIG. 3 illustrates an exemplary document before and after the application of a set of changes.

FIG. 3 illustrates, with reference to FIG. 1, an exemplary document 160 before and after the application of a set of changes.

The old layout 300 comprises a number of elements. Circle 310, an exemplary shape, contains textbox 315, composed of five lines of text. Square 320, another exemplary shape, contains textbox 325, composed of two lines of text. Star 340 is a third exemplary shape without a textbox. Textbox 330 contains nine lines of text, with line of text 335 comprising the last line of text of textbox 330. The new layout 350 contains many of the same elements, but with some changes. Circle 360 contains textbox 365, composed of the same five lines of text as textbox 315. Square 370 contains textbox 375, composed of the same two lines of text as textbox 325. Textbox 380 contains nine lines of text, with line of text 385 comprising the last line of textbox 380, which now includes the range of text 390 reading "geometry existed."

As can be seen, a number of changes have occurred between the old layout 300 and the new layout 350: the star 340 has been deleted, the circle 310 and square 320 have been moved along with the textboxes they contain, and the range of text "geometry existed." has been added to the end of the last line of text of the paragraph. A minimal set of difference structures would therefore comprise a difference corresponding to the combined move of circle 310 and 320, a difference corresponding to the deletion of star 340, and a difference corresponding to the insertion of text 390. While, in some embodiments, separate difference structures may have been generated for moving circle 310 and square 320, as neither is a sub-element of the other or contained within the other, the iterative merging process would have determined that the two differences are of the same type and are compatible.

Figure 4:
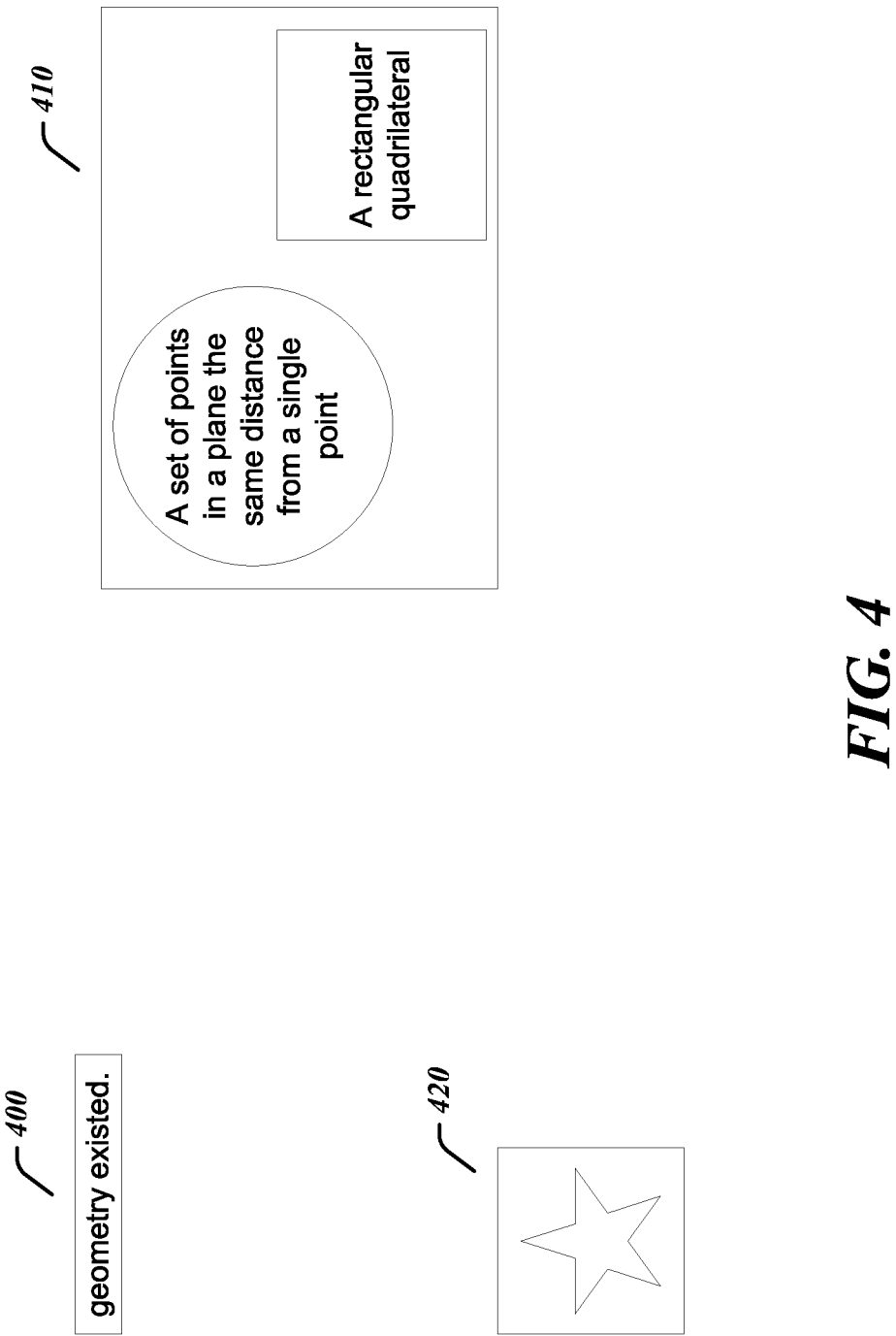
FIG. 4 illustrates three animation layers corresponding to the changes depicted in FIG. 3.

FIG. 4 illustrates, with reference to FIG. 1 and FIG. 3, three animation layers 400, 410, and 420 corresponding to the three difference structures described above. Insertion animation layer 400 corresponds to the insertion of text 390 "geometry existed." into the document 160. As previously discussed, insertion animation layer 400 may be animated by gradually fading the insertion animation layer 400 into view. As previously discussed, the generation of insertion animation layer 400 would involve extracting the image of the text 390 from a rendering of the new layout 350.

Move animation layer 410 corresponds to moving circle 310 and square 320, with their corresponding textboxes, from a first position to a second position. As previously discussed, move animation layer 410 may be animated by gradually transitioning the position of move animation layer 410 from its starting position to its ending position in document 160. As previously discussed, the generation of move animation layer 410 would involve extracting the image of circle 310 and square 320, with their corresponding textboxes 315 and 325, from a rendering of the old layout 300.

Deletion animation layer 420 corresponds to the removal of star 340 from the document 160. As previously discussed, deletion animation layer 420 may be animated by gradually fading the deletion animation layer 420 from view. As previously discussed, the generation of deletion animation layer 420 would involve extracting the image of the star 340 from a rendering of the old layout 300.

Figure 5:
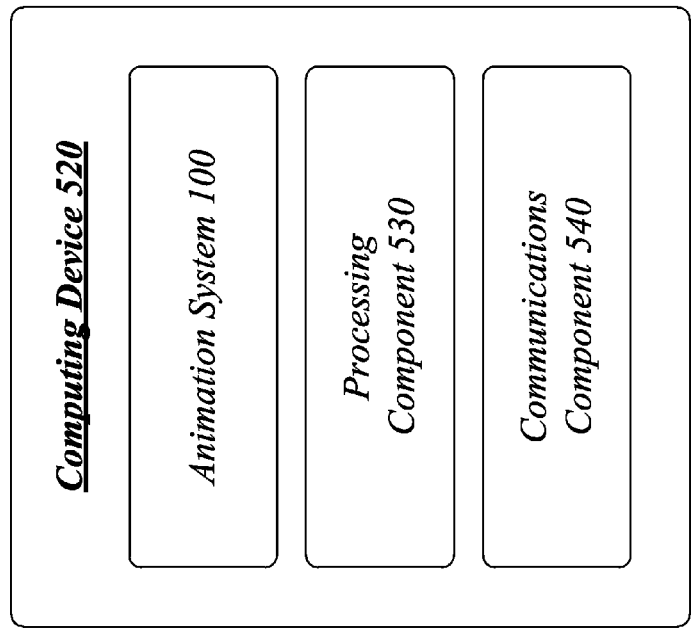
FIG. 5 illustrates an embodiment of a centralized system for the system of FIG. 1.

FIG. 5 illustrates a block diagram of a centralized system 500. The centralized system 500 may implement some or all of the structure and/or operations for the system 100 in a single computing entity, such as entirely within a single computing device 520.

The computing device 520 may execute processing operations or logic for the system 100 using a processing component 530. The processing component 530 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 520 may execute communications operations or logic for the system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 520 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 520.

In various embodiments, and in reference to FIG. 1, processing component 530 may comprise all or some of difference component 110, animation layer generation component 120, animation component 130, and display component 140.

Figure 6:
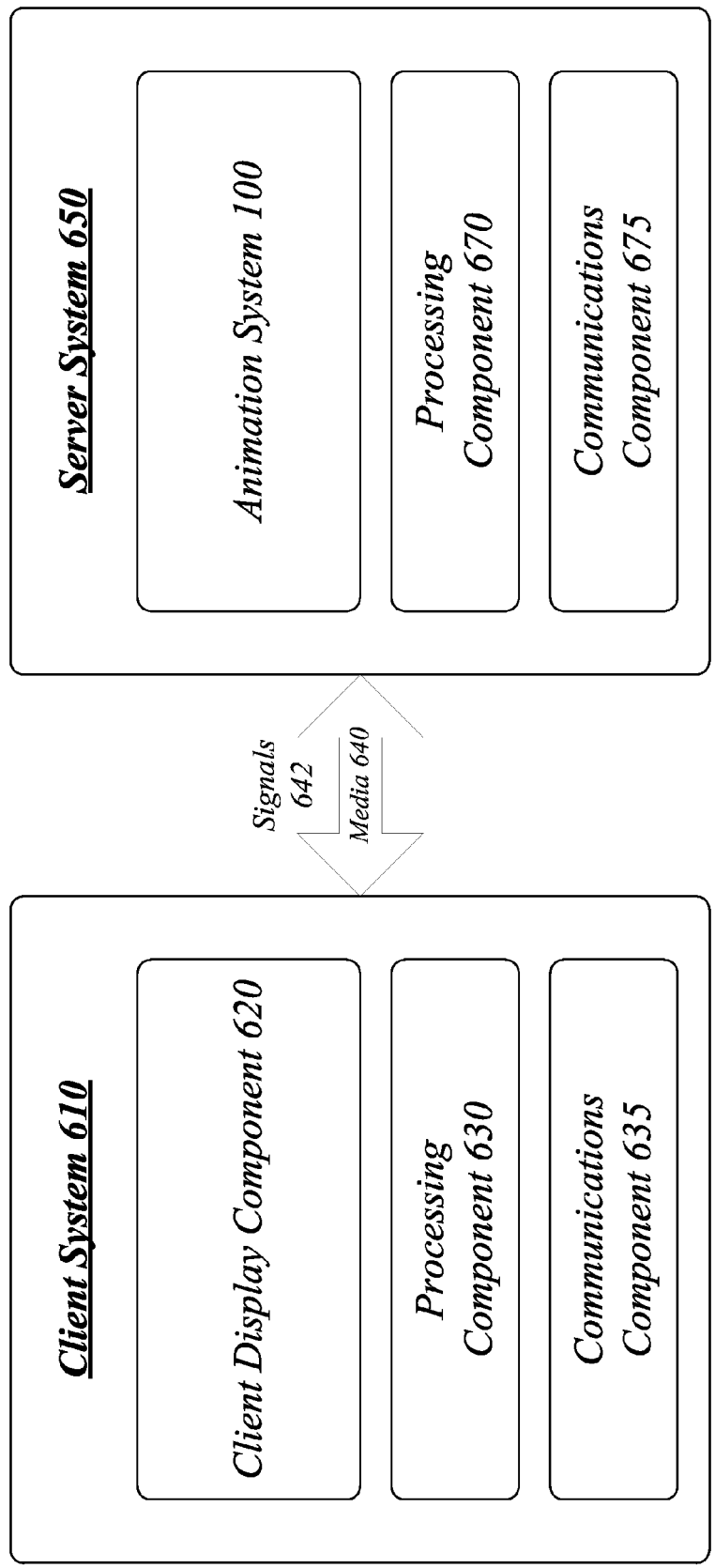
FIG. 6 illustrates an embodiment of a distributed system for the system of FIG. 1.

FIG. 6 illustrates a block diagram of a distributed system 600. The distributed system 600 may distribute portions of the structure and/or operations for the systems 100, 300 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 610 and the server system 650 may process information using the processing components 630 and 670, which are similar to the processing component 530 described with reference to FIG. 5. The client system 610 and the server system 650 may communicate with each over a communications media 640 using communications signals 642 via communications components 635 and 675, which are similar to the communications component 540 described with reference to FIG. 5.

In one embodiment, for example, the distributed system 600 may be implemented as a client-server system. A client system 610 may implement the display component 140. A server system 650 may implement the difference component 110, animation layer generation component 120, and animation component 130.

In various embodiments, the client system 610 may comprise or employ one or more client computing devices and/or client programs that operate to perform various methodologies in accordance with the described embodiments. In various embodiments, the client system 610 may comprise a client computer used for accessing an editing program implemented in part on server system 650. In various embodiments, the server system may be operative to receive edit commands from the client system 610 over media 640 using signals 642, perform the above-described process for generating an animation, and transmit the generated animation back to client system 610 over media 640 using 642 for display by client system 610 using client display component 620.

In various embodiments, the server system 650 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 650 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

Figure 7:
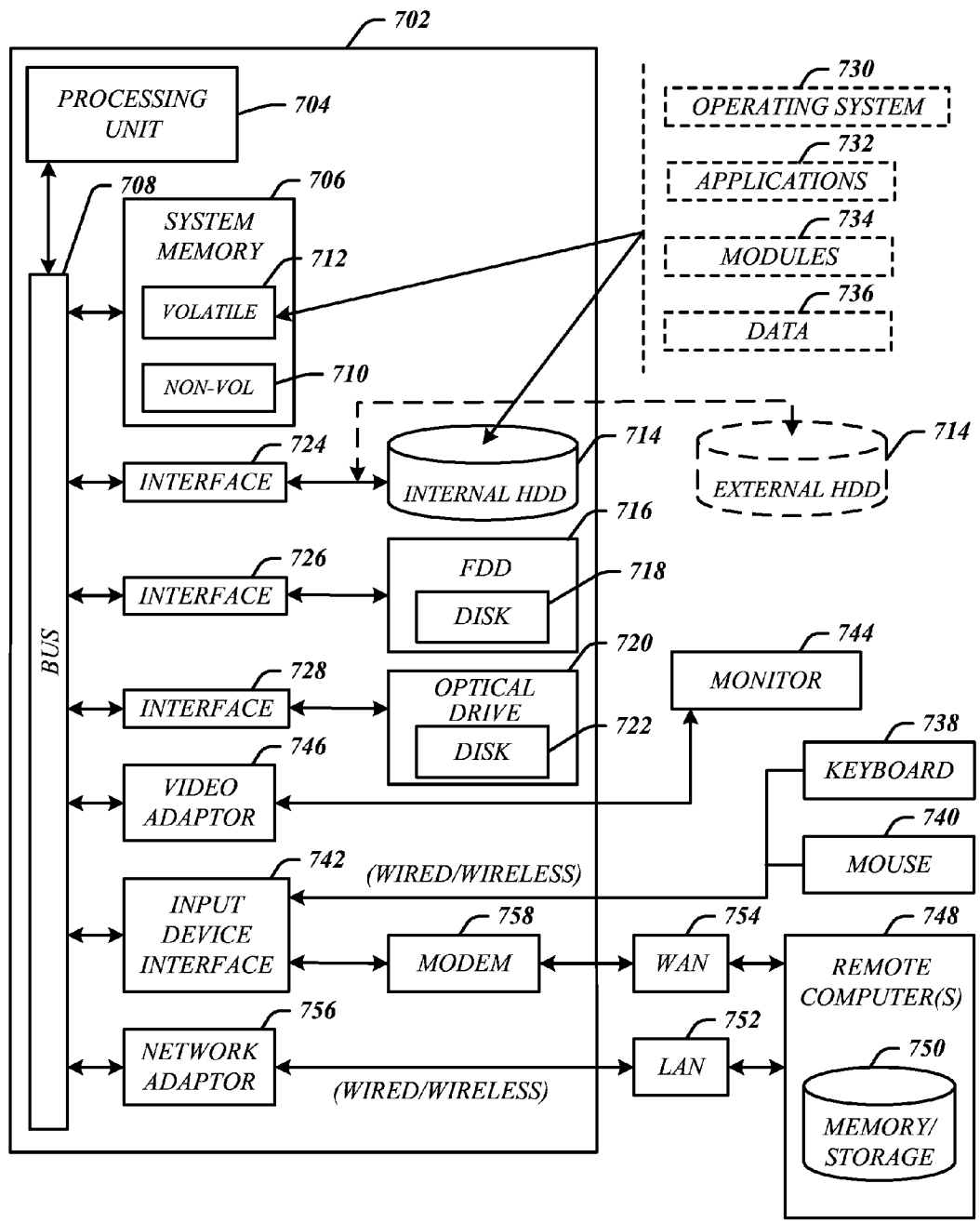
FIG. 7 illustrates an embodiment of a computing architecture.

FIG. 7 illustrates an embodiment of an exemplary computing architecture 700 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

The one or more application programs 732, other program modules 734, and program data 736 can include, for example, the difference component 110, the animation layer generation component 120, the animation component 130, and the display component 140.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
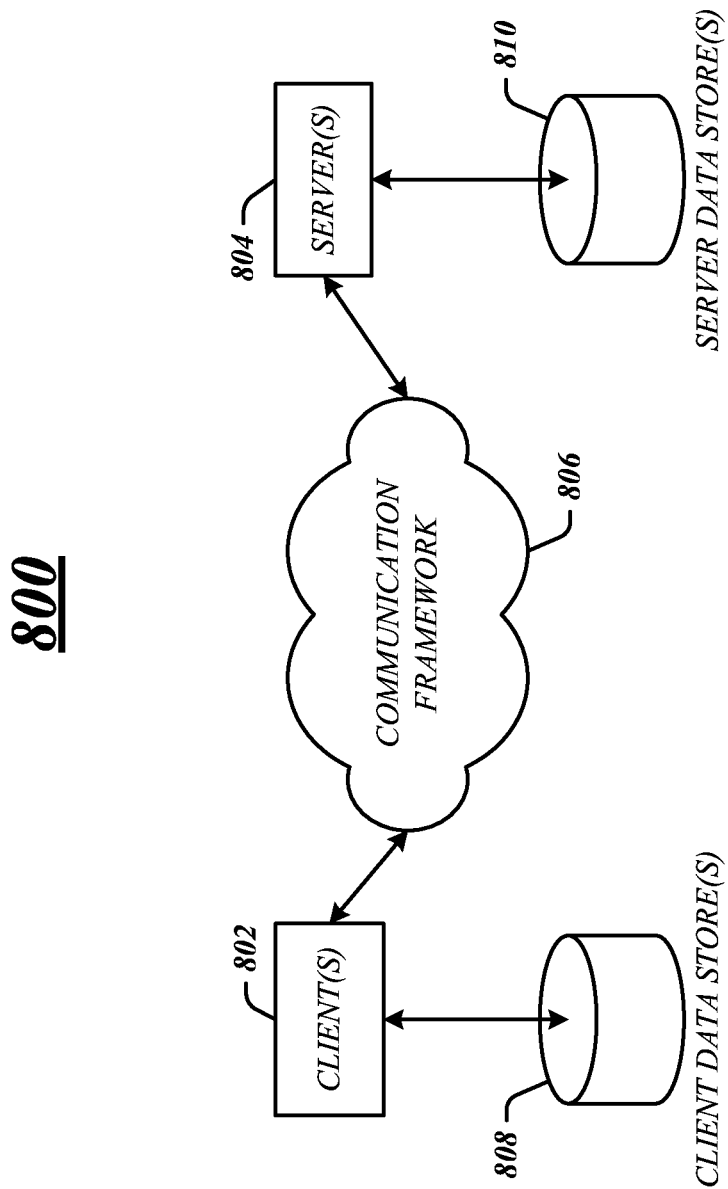
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client system 610. The servers 804 may implement the server system 650. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols, such as those described with reference to systems 100, 500, 600, and 700. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a logic circuit;
a difference component operative on the logic circuit to receive an old layout of a document and a new layout of the document, the new layout corresponding to an application of at least one change to the old layout of the document, the at least one change having been made via what-you-see-is-what-you-get (WYSIWYG) editing in an editing application, the difference component operative to determine a set of differences between the old layout and the new layout;
an animation layer generation component operative on the circuit to generate a set of animation layers from the set of differences, wherein at least one animation layer in the set of animation layers corresponds to at least one change to the old layout of the document; and
an animation component operative on the circuit to generate an animation using the generated set of animation layers, the animation having a duration based upon a combination of a complexity of a displayed page of the document, a complexity of the set of differences, a weight of a command carried out immediately prior to invoking the new layout, a momentum of editing, a zooming factor, a number of pages visible in the displayed portion of the document, and a maximum duration.

2. The apparatus of claim 1, the difference component operative to determine a first portion of the old layout and a second portion of the new layout, the second portion corresponding to the first portion after the application of the one or more changes, the difference component operative to generate a difference structure comprising differences between the first portion and the second portion, the difference structure used in determining the set of differences.

3. The apparatus of claim 1, the difference component operative to determine a plurality of difference structures, each difference structure being of a type, and to combine together compatible difference structures of a same type.

4. The apparatus of claim 3, the difference component operative to determine which difference structures to combine together by analyzing the plurality of difference structures for compatibility and type at iteratively smaller scopes.

5. The apparatus of claim 1, the new layout comprising a set of command hints, the command hints indicating information about one or more of the one or more changes, the difference component operative to determine the set of differences using the command hints wherein each command hint comprises a single command corresponding to a plurality of edit actions.

6. The apparatus of claim 1, the difference component operative to perform an iterative merging process to determine whether two or more changes are of a same type and are compatible comprising an animation component operative to generate an animation of the one or more changes using the generated set of animation layers.

7. The apparatus of claim 1, the animation component operative to determine the duration of the animation based on complexity information associated with the generated set of animation layers.

8. A method, comprising:
receiving an old layout of a document and a new layout of the document, the new layout corresponding to an application at least one change to the old layout of the document, the at least one change to the old layout of the document having been made via an editing application;
determining a set of differences between the old layout and the new layout;
generating a set of animation layers from the set of differences, wherein each animation layer in the set of animation layers corresponds to a separate change to the old layout of the document;
merging at least two animation layers based upon combining at least two compatible differences of a same type into a single generated difference; and
generating an animation from the merged set of animation layers with a duration based on a complexity of a displayed page of the document a complexity of the set of differences, a weight of a command carried out immediately prior to invoking the new layout, a momentum of editing, a zooming factor, a number of pages visible in the displayed portion of the document, and a maximum duration.

9. The method of claim 8, comprising:
determining a first portion of the old layout and a second portion of the new layout, the second portion corresponding to the first portion after the application of the one or more changes; and
generating a difference structure comprising differences between the first portion and the second portion, the difference structure used in determining the set of differences.

10. The method of claim 8, comprising:
determining a plurality of difference structures, each difference structure being of a type; and
combining together compatible difference structures of a same type.

11. The method of claim 10, comprising determining which difference structures to combine together by analyzing the plurality of difference structures for compatibility and type at iteratively smaller scopes.

12. The method of claim 8, the new layout comprising a set of command hints, the command hints indicating information about one or more of the one or more changes, wherein determining the set of differences comprises using the command hints.

13. The method of claim 8, comprising generating an animation of the one or more changes using the generated set of animation layers in which the animation combines at least two changes into a single animation layer.

14. The method of claim 13, comprising determining a duration of the animation based on complexity information associated with the generated set of animation layers.

15. An article of manufacture comprising a storage medium containing instructions that when executed cause a system to:
receive an old layout of a document and a new layout of the document, the new layout corresponding to an application of at least one change to the old layout of the document, the at least one change having been made via what-you-see-is-what-you-get (WYSIWYG) editing in an editing application;

determine a set of differences between the old layout and the new layout;

generate a set of animation layers from the set of differences, wherein at least one animation layer in the set of animation layers combines at least two changes to the old layout of the document to produce a unified visual result for an animation; and configure the animation with a duration based upon a combination of a complexity of a displayed page of the document a complexity of the set of differences, a weight of a command carried out immediately prior to invoking the new layout, a momentum of editing, a zooming factor, a number of pages visible in the displayed portion of the document, and a maximum duration.

16. The article of claim 15, comprising instructions that when executed cause the system to:

determine a first portion of the old layout and a second portion of the new layout, the second portion corresponding to the first portion after the application of the one or more changes; and generating a difference structure comprising differences between the first portion and the second portion, the difference structure used in determining the set of differences.

17. The article of claim 15, comprising instructions that when executed cause the system to:

determine a plurality of difference structures, each difference structure being of a type; and combine together compatible difference structures of a same type at a level of a hierarchy.

18. The article of claim 17, comprising instructions that when executed cause the system to:

determine which difference structures to combine together by analyzing the plurality of difference structures for compatibility and type at iteratively smaller scopes.

19. The article of claim 15, the new layout comprising a set of command hints, the command hints indicating information about one or more of the one or more changes, wherein determining the set of differences comprises using the command hints.

20. The article of claim 15, comprising instructions that when executed cause the system to:

determine a duration of the animation based on complexity information associated with the generated set of animation layers.

* * * * *